United States Patent
Muramatsu et al.

[19]

[11] Patent Number: 5,782,329
[45] Date of Patent: Jul. 21, 1998

[54] ONE-WAY CLUTCH ASSEMBLY HAVING DUAL SPRING SUPPORTED SPRAGS

[75] Inventors: Kazuhiko Muramatsu, Fukuroi; Yoshio Kinoshita, Shizuoka-ken, both of Japan

[73] Assignee: NSK-Warner Kabushiki Kaisha, Tokyo, Japan

[21] Appl. No.: 686,142

[22] Filed: Jul. 24, 1996

[30] Foreign Application Priority Data

Jul. 24, 1995 [JP] Japan .................... 7-187342

[51] Int. Cl.⁶ .................... F16D 41/07; F16D 41/06
[52] U.S. Cl. .................... 192/45.1; 192/41 A
[58] Field of Search .................... 192/45.1, 41 A

[56] References Cited

U.S. PATENT DOCUMENTS

| 3,324,980 | 6/1967 | Rojic et al. | 192/45.1 |
|---|---|---|---|
| 3,937,310 | 2/1976 | Oldfield | 192/45.1 X |
| 3,952,849 | 4/1976 | Brownhill et al. | 192/45.1 X |
| 4,867,292 | 9/1989 | Hartig | 192/45.1 X |
| 4,998,605 | 3/1991 | Ferris | 192/45.1 X |

FOREIGN PATENT DOCUMENTS 6-50359  2/1994  Japan.

*Primary Examiner*—Rodney H. Bonck
*Attorney, Agent, or Firm*—Skjerven Morrill MacPherson Franklin & Friel LLP; Thomas S. MacDonald

[57] ABSTRACT

A one-way clutch assembly includes a generally ring-shaped cage provide with a plurality of pairs of openings spaced apart from one another in the circumferential direction, a plurality of sprags, each pivotally movable in a corresponding opening, a pair of springs in resilient contact with each sprag from both sides; ring-shaped side plate sections; cage cam sections on the plate sections for limiting pivotal movement of each sprag; connection sections; and wherein one spring is engaged a connection section and a sprag in one opening and another spring is engaged with the connection section and a sprag in another opening of a pair of the openings. With the present one-way clutch assembly, a rapid and secure clutching operation is provided.

6 Claims, 6 Drawing Sheets

MALE GAUGE

FEMALE GAUGE

ONE-WAY CLUTCH ASSEMBLY HAVING DUAL SPRING SUPPORTED SPRAGS

BACKGROUND OF THE INVENTION

1. Field of the Invention

This invention generally relates to a one-way clutch which is used as a component for providing such functions as transmission of torque and back stop in a driving system of an automobile or the like, and, in particular, to a combined cage type one-way clutch assembly.

2. Description of the Prior Art

Conventionally, use has been made of a one-way clutch employing sprags for controlling the transmission of power between concentrically arranged outer and inner rings. In such a sprag type one-way clutch, the sprags change their orientation depending on the relative direction of rotation between the inner and outer rings such that the inner and outer rings are locked or unlocked to thereby establish or release a condition for transmitting power therebetween. Described more in detail in this respect with reference to FIGS. 1A and 1B, in FIG. 1A, an inner ring 7 rotates clockwise relative to an outer ring 6 and thus a sprag 4 is locked between the outer and inner rings 6 and 7, in which case, the outer ring 6 rotates clockwise together with the inner ring 7 as a unit. In such a locked condition, the sprag 4 takes a relatively upright condition so that its height in the radial direction of the one-way clutch becomes relatively high. On the other hand, as shown in FIG. 1B, in the case where the inner ring 7 rotates counterclockwise relative to the outer ring 6, the sprag 4 becomes unlocked between the outer and inner rings 6 and 7. As a result, the inner ring 7 rotates counterclockwise relative to the outer ring 6. In such an unlocked condition, the sprag 4 becomes inclined so that its height in the radial direction of the one-way clutch is relatively low.

A one-way clutch is used as arranged between the outer and inner rings 6 and 7 to control the transmission of power therebetween, whereby a plurality of sprags are arranged in a space between the outer and inner rings 6 and 7 circumferentially as spaced apart from one another and a clutch operation between the outer and inner rings 6 and 7 is effected depending on the orientation of sprags 4. In order to maintain such a plurality of sprags 4 in position, provision is made of a cage which is generally in the shape of a ring and provided with a plurality of openings spaced apart from one another in the circumferential direction. In each of the openings of the cage is provided a corresponding sprag 4 which may move pivotally or rockingly between its locked and unlocked positions as shown in FIGS. 1A and 1B.

The Japanese Patent Laid-open Pub. No. 6-50359 discloses a so-called combined cage comprised of paired male and female cage members which are left and right halves of the combined cage, and use is made of individual springs fixed to the cage for resiliently supporting sprags disposed inside a plurality of openings defined in the cage respectively. Described more in detail in this respect with reference to FIG. 2, the one-way clutch 1 described in the above-identified publication generally includes a combined type cage 3, which is generally ring-shaped and provided with a plurality of openings spaced apart from one another and arranged in the circumferential direction, a plurality of sprags 4, each disposed inside a corresponding opening, and springs 2, each resiliently urging a corresponding sprag 4 in a predetermined position. And, the cage 3 is also provided with a plurality of cage cam sections 3b spaced apart from one another in the circumferential direction, and each of the openings is defined between two adjacent cage cam sections.

One surface of the cage cam section 3b defines a cage cam surface 3b', which serves to limit the pivotal or rocking movement of the associated sprag 4 when it comes into contact therewith. the cage cam section 3b is provided with a bracket portion 3c to which one end of the associated spring 2 is fixedly attached. A tab 2a is formed at the free end of the spring 2 and the tab 2a is in resilient contact with the associated sprag 4 to thereby apply a predetermined force to the sprag 4. Thus, the sprag 4 is normally urged in a direction to be pressed against the cage cam surface 3b'.

However, with the above-described sprag supporting structure, since the sprag 4 is normally urged against the associated cage cam surface 3b', the movement of sprag 4 is rather limited so that such disadvantages as wear during idling could occur, and, moreover, when it is assembled into a space between the outer and inner rings, there is a case in which sprag 4 is prevented from being sufficiently pivoted to the unlocked direction, thereby causing an assembly error.

SUMMARY OF THE INVENTION

In accordance with the present invention, there is provided a one-way clutch assembly, comprising: a cage, which is generally ring-shaped and which is provided with a plurality of openings spaced apart from one another in the circumferential direction; a plurality of sprags, each pivotally disposed in a corresponding one of the plurality of openings; and spring means for supporting each of the sprags in a predetermined orientation, said spring means supporting each of the sprags at its opposite sides in the circumferential direction.

It is therefore a primary object of the present invention to provide an improved one-way clutch assembly which has obviated the above-described disadvantages of the prior art.

Another object of the present invention is to provide a one-way clutch assembly which is easy to manufacture and thus low at cost.

A further object of the present invention is to provide a one-way clutch assembly which allows to make the entire structure compact in size.

DESCRIPTION OF THE PREFERRED EMBODIMENTS

Figure 1A:
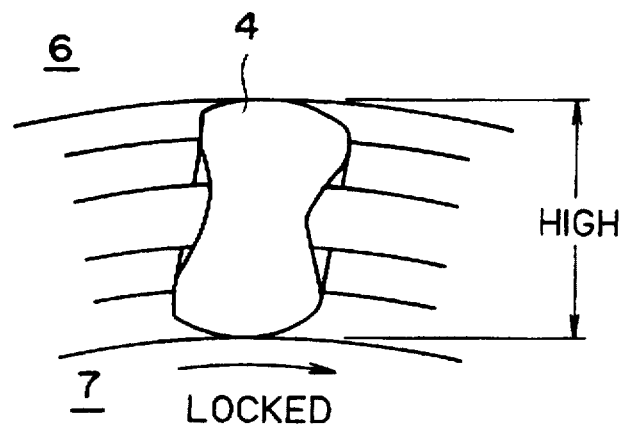
FIGS. 1A–1C are schematic illustrations useful for explaining the principle of operation of the prior art one-way clutch.
Figure 1B:
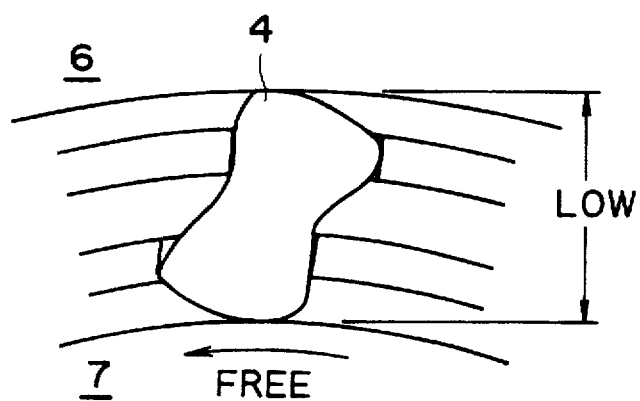
Figure 1C:
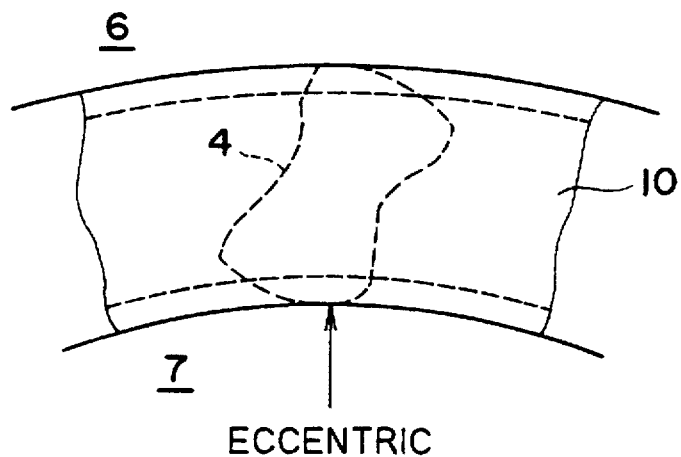
Figure 2:
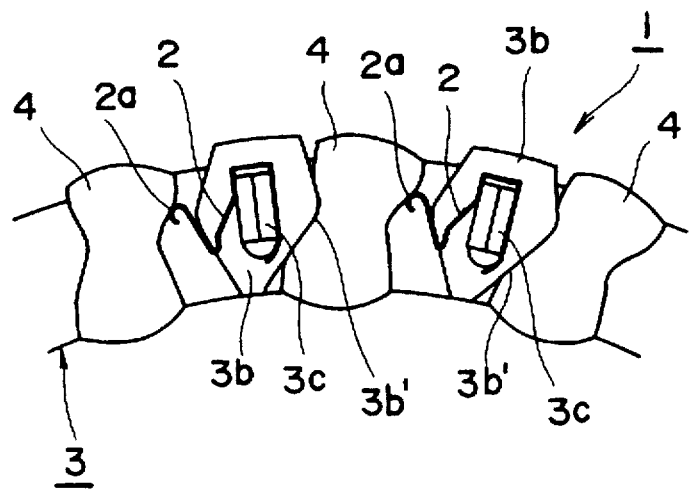
FIG. 2 is a schematic illustration showing part of the prior art one-way clutch employing a combined type cage.
Figure 3:
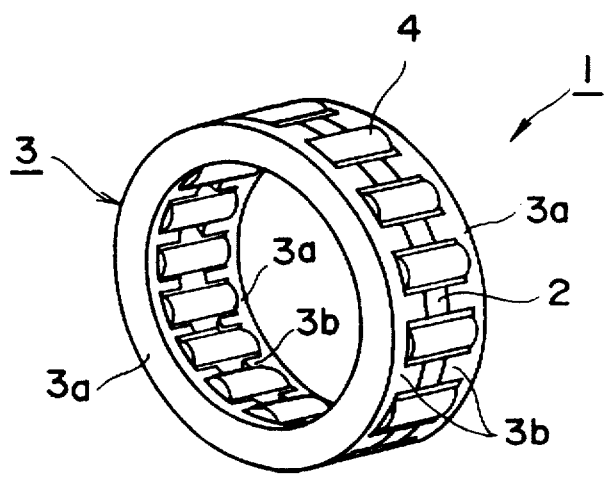
FIG. 3 is a schematic illustration showing in perspective view a one-way clutch assembly constructed in accordance with one embodiment of the present invention.

Referring first to FIG. 3, there is schematically shown in perspective view a one-way clutch assembly 1 constructed in accordance with one embodiment of the present invention. As shown, the assembly 1 includes a cage 3, which is generally in the shape of a ring and formed with a plurality of openings spaced apart from one another in the circumferential direction, a plurality of sprags 4, each located inside a corresponding one of the openings, and springs 2 which resiliently contact the sprags 4 from opposite sides so as to support them in a predetermined orientation.

Figure 4A:
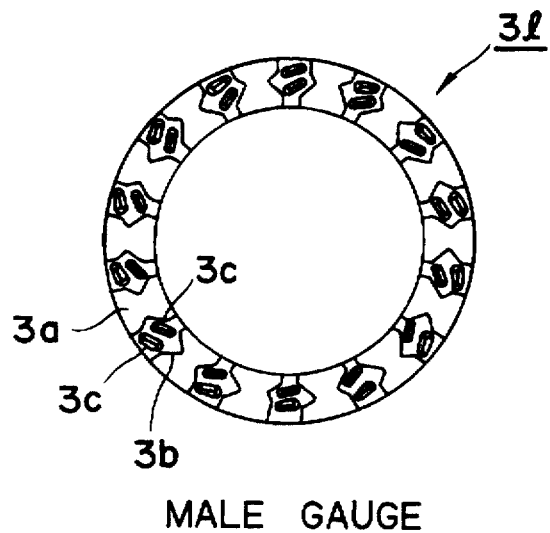
FIGS. 4A and 4B are schematic illustrations showing in plan view the left (male) and right (female) cage members, respectively, of a two-division type combined cage.
Figure 4B:
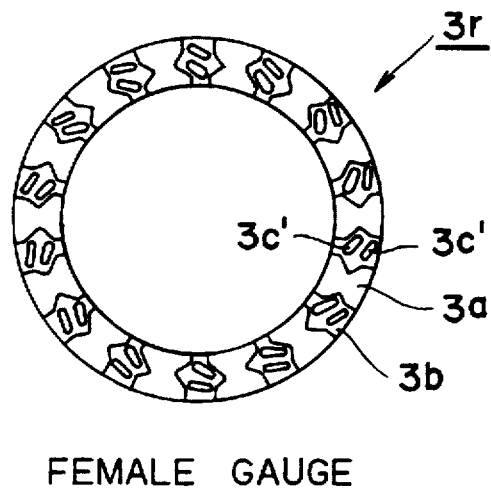

The cage 3, as shown in FIGS. 4A and 4B, is preferably of the combined type, in which case, the cage 3 is comprised of a pair of left cage member 31 and a right cage member 3r, which are manufactured separately and then combined together to define the integrated structure. Each of the left and right cage members 31 and 3r includes a ring-shaped side plate section 3a, a plurality of cage cam sections 3b provided on the side plate section 3a spaced apart from one another in the circumferential direction, and a connection section 3c or 3c' provided at each of the cage cam sections 3b. In the illustrated embodiment, the connection sections 3c and 3c' are provided as a pair of projections 3c and associated holes 3c', but the connection sections 3c and 3c' can take any other shapes and forms as desired. As will be described in detail later, the connection projection 3c is so structured to hold at least one spring 2 in position.

In the specific embodiment shown in FIGS. 4A and 4B, the left cage member 31 includes a pair of connection projections 3c formed at each of the cage cam sections 3b to thereby define a male cage member. On the other hand, the right cage member 3r includes a pair of holes 3c' formed at each of its cage cam sections 3b to thereby define a female cage member, and the holes 3c' are so located to receive therein the associated pair of connection projections 3c of the left (male) cage member 31 when combined. As a result, the left and right cage members 31 and 3r can be combined into the integral cage 3 by having the pair of connection projections 3c of left (male) cage member 31 inserted into the associated pair of connection holes 3c' of right (female) cage member 3r.

It is to be noted, however, that a cage which can be used in a one-way clutch assembly of the present invention should not be limited to the above-described specific example. For example, as another embodiment, the left and right cage members 31 and 3r can be constructed to be symmetrical in structure each other. That is, for example, in each of the left and right cage members, the connection projections 3c can be provided at alternate cage cam sections 3b and connection holes 3c' can be provided in the remaining alternate cage cam sections 3b. In this case, since the left and right cage members 31 and 3r are symmetrical in structure, use may be made of the same mold for manufacturing the cage members, thereby facilitating the manufacturing process and easing the inventory management. Moreover, in the above-described embodiment, although a pair of connection projections 3c is provided for each cage cam section 3b, any desired number of such connection projections 3c can be provided. The cage 3 can be manufactured from any desired material, including plastics and metals.

Figure 5:
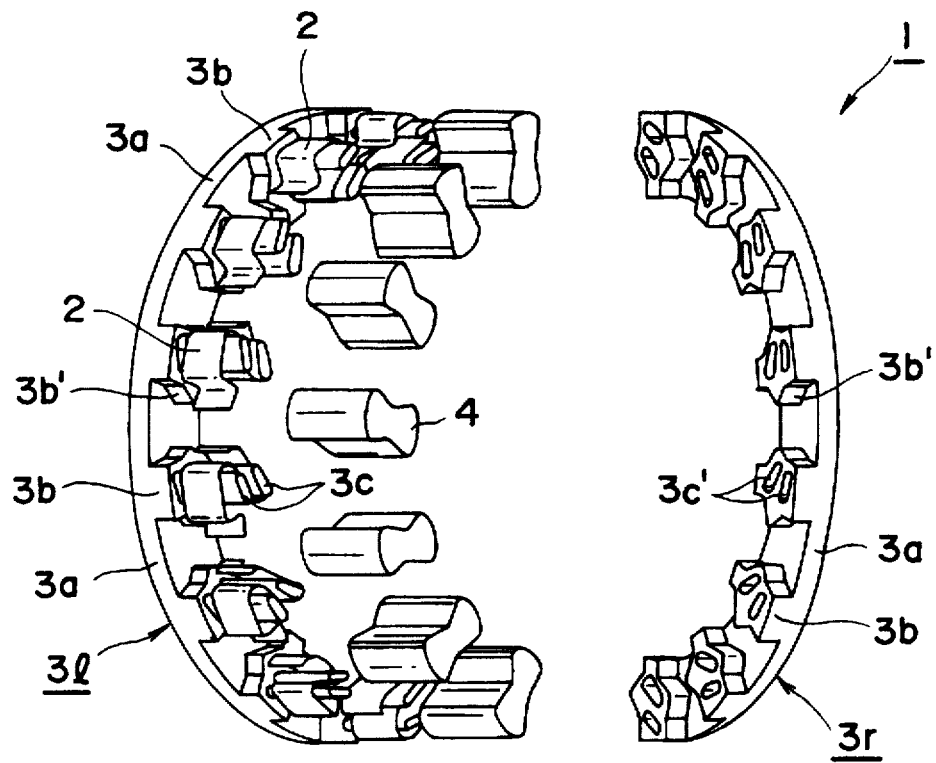
FIG. 5 is a schematic illustration showing in an exploded, perspective view a one-way clutch assembly embodying the present invention.

FIG. 5 illustrates in an exploded, perspective view a one-way clutch assembly 1 constructed in accordance with one embodiment of the present invention. The one-way clutch assembly 1 includes a cage 3 which is constructed by combining the left (male) cage member 31 and the right (female) cage member 3r shown in FIGS. 4A and 4B, respectively, together in an integrated form. In the embodiment shown in FIG. 5, a single spring 2 is provide d in engagement with a corresponding pair of connection projections 3c and the spring 2 is so set to locate its opposite ends located inside a pair of sprag openings provided on both sides of the connection projections 3c. A sprag 4 is disposed inside a corresponding sprag opening pivotally movably such that it is supported and resiliently urged by a pair of associated springs 2 at its opposite sides.

Figure 6:
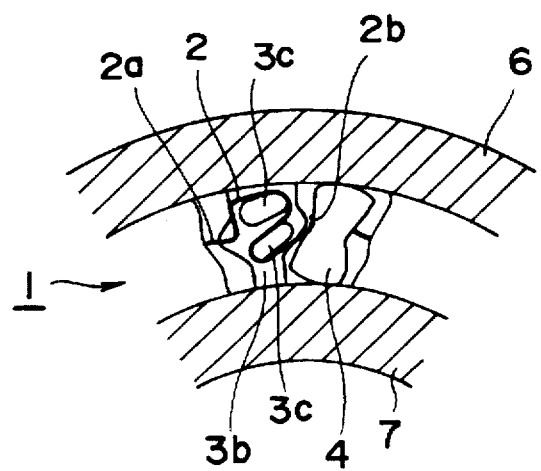
FIG. 6 is a schematic illustration showing the condition when a one-way clutch assembly embodying the present invention has been mounted between its associated outer and inner rings.

FIG. 6 illustrates the condition in which a one-way clutch assembly 1 embodying the present invention is mounted between a pair of outer and inner rings 6 and 7. Although not shown specifically, it is to be noted that a predetermined clearance is set between the one-way clutch assembly 1 and the outer ring 6 and also between the one-way clutch assembly 1 and the inner ring 7. In the one-way clutch assembly 1 of the present invention, since each of the sprags 4 is resiliently urged or supported by a pair of associated, separate springs 2 from both sides, the pivotal motion of sprag 4 is quite smooth, thereby providing an excellent clutch operation. Moreover, since a cage cam section 3b is formed with a cage cam surface 3b', an excessive pivotal motion of sprag 4 can be prevented from occurring when the sprag 4 comes into contact with the cage cam surface 3b'.

Figure 7A:
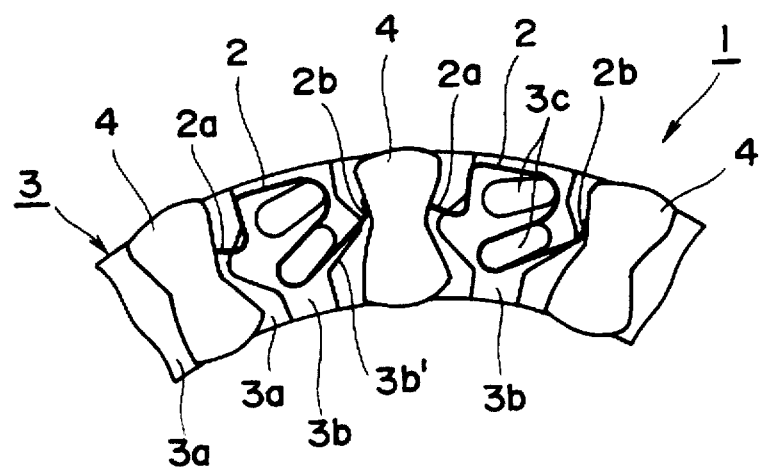
FIG. 7A is a schematic illustration showing part of a single spring type one-way clutch assembly constructed in accordance with one embodiment of the present invention.

FIG. 7A is a schematic illustration showing more in detail a one-way clutch assembly constructed in accordance with one embodiment of the present invention. That is, the cage 3 includes a ring-shaped side plate section 3a, a plurality of cage cam sections 3b integrally provided on the side plate section 3a as spaced apart from one another in the circumferential direction, and a pair of connection projections 3c extending upright from each of the cage cam sections 3b. A cage cam surface 3b' is formed at one side of the cage cam section 3b and it serves to limit the pivotal motion of the sprag 4, thereby preventing an excessive pivotal motion of the sprag 4. There is provided a spring 2 having the shape generally in the form of figure "2" and constructed from a single piece of material as supported in engagement with an associated pair of connection projections 3c. The spring 2 is positioned with its intermediate portion engaged with an associated pair of connection projections 3c, and it has its one end formed with a sprag urging portion 2a and its opposite end formed with a sprag holding portion 2b.

Figure 8A:
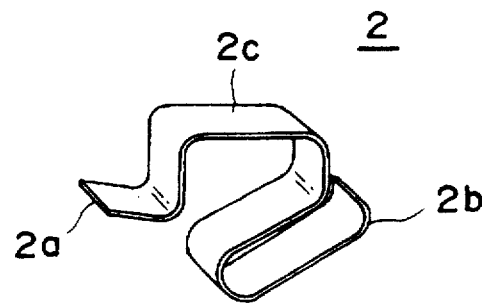
FIGS. 8A–8C are schematic illustrations showing in perspective view several examples of a spring which can be advantageously used in a one-way clutch assembly of the present invention.

A detailed structure of the spring 2 used in the embodiment shown in FIG. 7A is shown in FIG. 8A in a perspective view. That is, as shown in FIG. 8A, the spring 2 has a shape generally in the form of figure "2" and a sprag urging portion 2a is formed at its one end. In this case, the sprag urging portion 2a extends generally straight horizontally and it urges its associated sprag 4 through a resilient contact with an intermediate constricted portion of sprag 4. On the other hand, the opposite end of spring 2 is formed with a sprag holding portion 2b, and, in the instant embodiment, its end is bent vertically upwardly to form the sprag holding portion 2b, which abuts against the intermediate constricted portion of sprag 4 to hold the sprag 4 in position.

Returning to FIG. 7A, the sprag holding portion 2b of left side spring 2 is in contact with the left side of the intermediate constricted portion of sprag 4 and the sprag urging portion 2a of right side spring 2 urges the sprag 4 through a resilient contact with the right side of the intermediate constricted portion of sprag 4. Thus, normally, the sprag 4 is resiliently supported by a pair of springs located on its opposite sides and is not in contact with the cage cam section 3b. As described before, the cage cam section 3b is formed with a cage cam surface 3b' which serves to limit the pivotal motion of sprag 4. With this structure, since the spring 2 can be set in position simply by having it inserted under pressure between an associated pair of connection projections 3c, its assembling operation is extremely simple. In addition, when locating sprags 4 in position, they can be set in position simply by pushing each of them between an associated pair of springs 2. Thus, an assembling operation of sprags 4 is also quite simple.

Figure 7B:
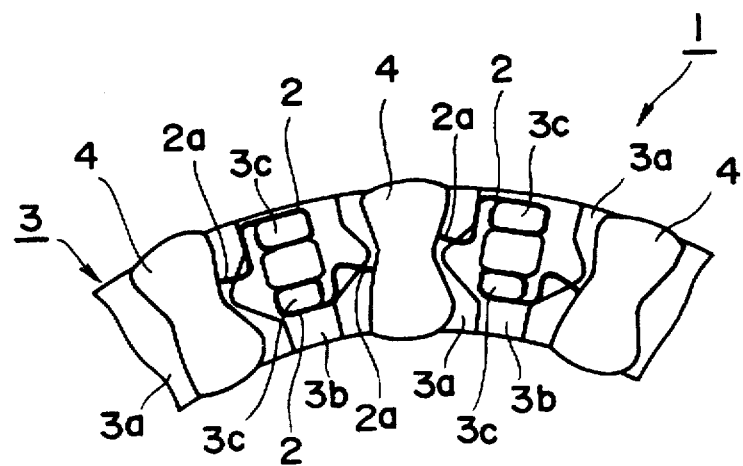
FIG. 7B is a schematic illustration showing part of a double spring type one-way clutch assembly constructed in accordance with another embodiment of the present invention.

FIG. 7B is a schematic illustration showing in detail part of a one-way clutch assembly 1 constructed in accordance with another embodiment of the present invention. In this embodiment, a spring 2 is fixedly attached to each of a pair of connection projections 3c. That is, in this embodiment, the spring 2 has its one end fixedly attached to a corresponding connection projection 3c and its opposite end defined as a free end to be in resilient contact with an associated sprag 4. In the embodiment shown in FIG. 7B, a pair of outer and inner connection projections 3c are provided as spaced apart from each other in the radial direction, and the spring 2 extending from the outer connection projection 3c is in resilient contact with the left side sprag 4, and, on the other hand, the spring 2 extending from the inner connection projection 3c is in resilient contact with the right side sprag 4. Thus, when viewed from a single sprag 4, it may be understood that the sprag 4 is, in fact, supported from both sides by a pair of separate springs 2. In this case also, the end of one of a pair of springs 2 in resilient contact with the sprag 4 may be bent in a desired manner.

Figure 8B:
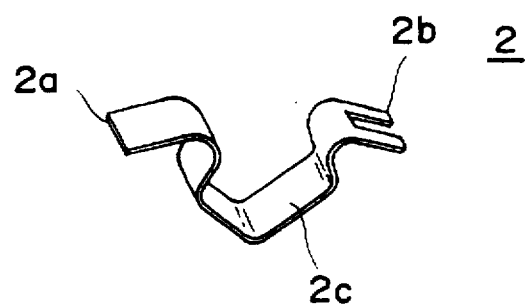
Figure 8C:
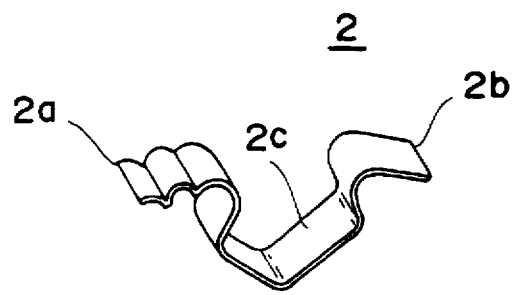

FIGS. 8B and 8C illustrate possible other embodiments of spring 2. In the embodiment shown in FIG. 8B, the spring 2 has a shape generally in the form of letter "U" with its one end defined as sprag urging portion 2b and its opposite end defined as sprag holding portion 2b. The sprag holding portion 2b is formed with a cut-way portion, thereby allowing to secure a tow-point contact. Moreover, in the embodiment shown in FIG. 8C, similarly with the embodiment shown in FIG. 8B, it has a shape generally in the form of letter "U", but its sprag urging portion 2a is formed with a corrugated structure to thereby provide an increased resiliency.

It is to be noted that the sprag urging portion 2a and the sprag holding portion 2b should not be limited to the shapes of these specific embodiments and they may take any desired shape and structure as long as they can resiliently contact with an associated sprag 4. However, the sprag urging portion 2a is intended to provide the sprag 4 with a necessary contact force which allows the sprag 4 to establish a secure clutched condition with the outer and inner rings, and, on the other hand, the sprag holding portion 2b is expected to keep a balance with a force which sprag 4 receives from the sprag urging portion 2a and to align all of the sprags 4 arranged in the circumferential direction in a predetermined angle when assembled in a one-way clutch, thereby allowing to ease an assembling operation thereof. Furthermore, it is also expected to serve to absorb or mitigate an impact which the cage 3 receives from the sprags 4. In addition, the sprag holding portion 2b is expected to have a function to make the motion of sprag 4 smooth and to reduce wear of sprag 4 during idling.

As described above, in accordance with the present invention, there is provided a one-way clutch assembly which is secure and rapid in clutching operation. In addition, a one-way clutch assembly can be manufactured with ease and low at cost. Furthermore, a one-way clutch assembly compact in size can be provided. The motion of a sprag, and, thus, the operation of a one-way clutch assembly itself can be made quite smooth. Besides, the sprags are prevented from being damaged effectively, and, thus, the life of a one-way clutch assembly is prolonged.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A one-way clutch assembly comprising:
   a generally ring-shaped cage provided with a plurality of openings spaced apart from one another in a circumferential direction and with engaging means between two adjacent openings;
   a plurality of sprags each provided pivotally movably in a corresponding one of said plurality of openings;
   at least one spring means in engagement with said engaging means and extending into at least one of the two openings adjacent to said engaging means to be in contact with the sprag provided therein;
   wherein each of said plurality of sprags provided in a corresponding one of said plurality of openings is contacted by the spring means engaged with the engaging means on both sides of said corresponding opening;
   wherein said cage includes a pair of ring-shaped side plate sections;
   a plurality of cage cam sections provided on at least one of said side plate sections spaced apart from one another in a circumferential direction, each of said plurality of cage cam sections having a cam surface for limiting a pivotal motion of the pairs in said opening;
   a plurality of connection sections for connecting said pair of side plate sections at a plurality of locations in a circumferential direction, at least part of said connection sections defining said engaging means; and
   wherein each of said spring means includes a pair of first and second spring members, each having a predetermined shape, said first spring member being engaged with said engaging means of said connection section and in engagement with a sprag provided in a first opening, which is one of a pair of openings adjacent to said engaging means, said second spring member being engaged with said engaging means of said connection section and in engagement with a sprag provided in a second opening of said pair of openings adjacent to said engaging means.

2. The assembly of claim 1, wherein said connection section includes first and second engaging means and said first spring member is engaged with said first engaging means with said second spring member engaged with said second engaging means.

3. A one-way clutch assembly, comprising:
   a generally ring-shaped cage provided with a plurality of openings spaced apart from one another in a circumferential direction and with engaging means between two adjacent openings;
   a plurality of sprags, each provided pivotally movably in a corresponding one of said plurality of openings;
   at least one spring means in engagement with said engaging means and extending into at least one of the two openings adjacent to said engaging means to be in contact with the sprag provided therein;

wherein each of said plurality of sprags provided in a corresponding one of said plurality of openings is contacted by the spring means engaged with the engaging means on both sides of said corresponding opening;

wherein said cage includes a pair of ring-shaped side plate sections;

a plurality of cage cam sections provided on at least one of said side plate sections spaced apart from one another in a circumferential direction, each of said plurality of cage cam sections having a cam surface for limiting a pivotal motion of the pairs in said opening;

a plurality of connection sections for connecting said pair of side plate sections at a plurality of locations in a circumferential direction, at least part of said connection sections defining said engaging means;

wherein at least some of said plurality of connection sections are integrally formed with one of said side plates, the other side plate being formed with a hole for receiving a tip end of a corresponding connection section integrally formed with said one of said side plates, the remaining connection sections being integrally formed with said other side plate and said one of said side plates being formed with a hole for receiving a tip end of a corresponding one of the remaining connection sections integrally formed with said other side plates;

wherein each of said spring means includes a pair of first and second spring members, each having a predetermined shape, said first spring member being engaged with said engaging means of said connection section and in engagement with a sprags provided in a first opening, which is one of a pair of openings adjacent to said engaging means, said second spring member being engaged with said engaging means of said connection section and in engagement with a sprag provided in a second opening of said pair of openings adjacent to said engaging means.

4. A one-way clutch assembly, comprising:

a generally ring-shaped cage provided with a plurality of openings spaced apart from one another in a circumferential direction and with engaging means between two adjacent openings;

a plurality of sprags, each provided pivotally movably in a corresponding one of said plurality of openings;

at least one spring means in engagement with said engaging means and extending into at least one of the two openings adjacent to said engaging means to be in contact with the sprag provided therein;

wherein each of said plurality of sprags provided in a corresponding one of said plurality of openings is contacted by the spring means engaged with the engaging means on both sides of said corresponding opening;

wherein said cage includes a pair of ring-shaped side plate sections;

a plurality of cage cam sections provided on at least one of said side plate sections spaced apart from one another in a circumferential direction, each of said plurality of cage cam sections having a cam surface for limiting a pivotal motion of the pairs in said opening;

a plurality of connection sections for connecting said pair of side plate sections at a plurality of locations in a circumferential direction, at least part of said connection sections defining said engaging means;

wherein at least some of said plurality of connection sections are integrally formed with one of said side plates, the other side plate being formed with a hole for receiving a tip end of a corresponding connection section integrally formed with said one of said side plates, the remaining connection sections being integrally formed with said other side plate and said one of said side plates being formed with a hole for receiving a tip end of a corresponding one of the remaining connection sections integrally formed with said other side plates;

wherein said plurality of cage cam sections are provided on said pair of side plate sections in an opposed fashion, and said plurality of connection sections are integrally formed at the cage cam sections of one of said pair of side plate sections with the cage cam sections of said other side plate being formed with holes for receiving therein tip ends of the connection sections, whereby said plurality of connection sections are inserted into said holes to define said cage in an integrated form;

wherein each of said spring means includes a pair of first and second spring members, each having a predetermined shape, said first spring member being engaged with said engaging means of said connection section and in engagement with a sprags provided in a first opening, which is one of a pair of openings adjacent to said engaging means, said second spring member being engaged with said engaging means of said connection section and in engagement with a sprag provided in a second opening of said pair of openings adjacent to said engaging means.

5. A one-way clutch assembly, comprising:

a generally ring-shaped cage provided with a plurality of openings spaced apart from one another in a circumferential direction and with engaging means between two adjacent openings;

a plurality of sprags, each provided pivotally movably in a corresponding one of said plurality of openings;

at least one spring means in engagement with said engaging means and extending into at least one of the two openings adjacent to said engaging means to be in contact with the sprag provided therein;

wherein each of said plurality of sprags provided in a corresponding one of said plurality of openings is contacted by the spring means engaged with the engaging means on both sides of said corresponding opening;

wherein said cage includes a pair of ring-shaped side plate sections;

a plurality of cage cam sections provided on at least one of said side plate sections spaced apart from one another in a circumferential direction, each of said plurality of cage cam sections having a cam surface for limiting a pivotal motion of the sprag in said opening;

a plurality of connection sections for connecting said pair of side plate sections at a plurality of locations in a circumferential direction, at least part of said connection sections defining said engaging means;

wherein each of said spring means includes a pair of first and second spring members, each having a predetermined shape, said first spring member being engaged with said engaging means of said connection section in engagement with a sprag provided in a first opening, which is one of a pair of openings adjacent to said engaging means, said second spring member being engaged with said engaging means of said connection section and in engagement with a sprag provided in a second opening, which is a remaining opening of said pair of openings adjacent to said engaging means;

wherein at least some of said plurality of connection sections are integrally formed with one of said side plates, the other side plate being formed with a hole for receiving a tip end of a corresponding connection section integrally formed with said one of said side plates, the remaining connection sections being integrally formed with said other side plate and said one of said side plates being formed with a hole for receiving a tip end of a corresponding one of the remaining connection sections integrally formed with said other side plate; and wherein said connection section includes first and second engaging means and said first spring member is engaged with said first engaging means with said second spring member engaged with said second engaging means.

6. A one-way clutch assembly, comprising:

a generally ring-shaped cage provided with a plurality of openings spaced apart from one another in a circumferential direction and with engaging means between two adjacent openings;

a plurality of sprags, each provided pivotally movably in a corresponding one of said plurality of openings;

at least one spring means in engagement with said engaging means and extending into at least one of the two openings adjacent to said engaging means to be in contact with the sprag provided therein;

wherein each of said engaging means to be in contact with the sprag provided in a corresponding one of said plurality of openings is contacted by the spring means engaged with the engaging means on both sides of said corresponding opening;

wherein said cage includes a pair of ring-shaped side plate sections;

a plurality of cage cam sections provided on at least one of said side plat sections spaced apart from one another in a circumferential direction, each of said plurality of cage cam sections having a cam surface for limiting a pivotal motion of the sprag in said opening;

a plurality of connection sections for connecting said pair of side plate sections at a plurality of locations in a circumferential direction, at least part of said connection sections defining said engaging means;

wherein at least some of said plurality of connection sections are integrally formed with one of said side plates, the other side plate being formed with a hole for receiving a tip end of a corresponding connection section integrally formed with said one of said side plates, the remaining connection sections being integrally formed with said other side plate and said one of said side plates being formed with a hole for receiving a tip end of a corresponding one of the remaining connection sections integrally formed with said other side plate;

wherein said plurality of cage cam sections are provided on said pair of side plate sections in an opposed fashion, and said plurality of connection sections are integrally formed at the cage cam sections of one of said pair of side plate sections with the cage cam sections of said other side plate being formed with holes for receiving therein tip ends of the connection sections, whereby said plurality of connection sections are inserted into said holes to define said cage in an integrated form;

wherein each of said spring means includes a pair of first and second spring members, each having a predetermined shape, said first spring member being engaged with said engaging means of said connection section in engagement with a sprag provided in a first opening, which is one of a pair of openings adjacent to said engaging means, said second spring member being engaged with said engaging means of said connection section and in engagement with a sprag provided in a second opening, which is a remaining opening of said pair of openings adjacent to said engaging means; and wherein said connection section includes first and second engaging means and said first spring member is engaged with said first engaging means with said second spring member with said second engaging means.

* * * * *